(12) United States Patent
Li

(10) Patent No.: US 12,387,454 B2
(45) Date of Patent: Aug. 12, 2025

(54) METHOD, APPARATUS AND COMPUTER READABLE MEDIA FOR OBJECT DETECTION

(71) Applicant: Nokia Technologies Oy, Espoo (FI)

(72) Inventor: Yazhao Li, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 334 days.

(21) Appl. No.: 17/284,075

(22) PCT Filed: Oct. 12, 2018

(86) PCT No.: PCT/CN2018/110064
§ 371 (c)(1),
(2) Date: Apr. 9, 2021

(87) PCT Pub. No.: WO2020/073316
PCT Pub. Date: Apr. 16, 2020

(65) Prior Publication Data
US 2021/0357640 A1    Nov. 18, 2021

(51) Int. Cl.
*G06V 10/25* (2022.01)
*G06N 3/02* (2006.01)
(Continued)

(52) U.S. Cl.
CPC .............. *G06V 10/25* (2022.01); *G06N 3/02* (2013.01); *G06T 5/30* (2013.01); *G06V 10/764* (2022.01);
(Continued)

(58) Field of Classification Search
CPC ...... G06V 10/25; G06V 10/764; G06V 20/00; G06N 3/02; G06T 5/30; G06T 2207/20016
See application file for complete search history.

(56) References Cited

U.S. PATENT DOCUMENTS

| | | | |
|---|---|---|---|
| 9,390,315 B1* | 7/2016 | Yalniz | ............ G06T 7/90 |
| 2017/0124409 A1* | 5/2017 | Choi | ............ G06V 10/25 |
| 2018/0165551 A1 | 6/2018 | Roh et al. | |

FOREIGN PATENT DOCUMENTS

| | | |
|---|---|---|
| CN | 107045345 A | 8/2017 |
| CN | 107341517 A | 11/2017 |
| | (Continued) | |

OTHER PUBLICATIONS

Extended European Search Report received for corresponding European Patent Application No. 18936855.8, dated May 13, 2022, 10 pages.
(Continued)

*Primary Examiner* — Jianxun Yang
(74) *Attorney, Agent, or Firm* — Harness, Dickey & Pierce, P.L.C.

(57) ABSTRACT

Methods, apparatuses and computer program products for object detection. A method comprises extracting a generic feature of an image characterizing one or more general properties of the image(310); identifying one or more regions of interest (ROIs) (320); generating scale information on one or more objects in the image based on the generic feature and one or more candidate scales(330); generating one or more scale-specific features of the image based on the scale information(340); and detecting the one or more objects in the image based on the identified one or more ROIs and the one or more scale-specific features(350).

16 Claims, 6 Drawing Sheets

(51) Int. Cl.
*G06T 5/30* (2006.01)
*G06V 10/764* (2022.01)
*G06V 20/00* (2022.01)

(52) U.S. Cl.
CPC .... *G06T 2207/20016* (2013.01); *G06V 20/00* (2022.01)

(56) References Cited

FOREIGN PATENT DOCUMENTS

| CN | 108229366 A | 6/2018 |
|---|---|---|
| CN | 108573244 A | 9/2018 |
| EP | 2246806 A1 | 11/2010 |

OTHER PUBLICATIONS

Zhao et al., "Improved Single Shot Object Detector Using Enhanced Features and Predicting Heads", IEEE Fourth International Conference on Multimedia Big Data (BigMM), Sep. 13-16, 2018, 5 pages.

Li et al., "Pedestrian detection with dilated convolution, region proposal network and boosted decision trees", International Joint Conference on Neural Networks (IJCNN), May 14-19, 2017, pp. 4052-4057.

Office action received for corresponding Indian Patent Application No. 202147020385, dated Feb. 14, 2022, 5 pages.

Ren et al., "Faster R-CNN: Towards Real-Time Object Detection with Region Proposal Networks", Thu, Jun. 4, 2015 07:58:34 UTC (2,095 KB), https://arxiv.org/abs/1506.01497?context=cs.CV.

Dai et al., "R-fcn: Object Detection via Region-based Fully Convolutional Networks", Proceedings of the 30th International Conference on Neural Information Processing Systems, Dec. 2016, pp. 1-9.

Liu et al., "SSD: Single Shot MultiBox Detector", European Conference on Computer Vision, 2016, pp. 21-37.

Zhang et al., "Single-Shot Object Detection with Enriched Semantics", Conference on Computer Vision and Pattern Recognition, vol. 1, 2018, pp. 5813-5821.

Lin et al., "Feature Pyramid Networks for Object Detection", IEEE Conference on Computer Vision and Pattern Recognition, 2017, pp. 936-944.

Lin et al., "Focal loss for dense object detection", Proceedings of the IEEE International Conference on Computer Vision (ICCV), 2017, pp. 2980-2988.

Hao et al., "Scale-Aware Face Detection", Proceedings of the IEEE Conference on Computer Vision and Pattern Recognition (CVPR), 2017, pp. 6186-6195.

Song et al., "Beyond Trade-off: Accelerate FCN-based Face Detector with Higher Accuracy", Computer Vision and Pattern Recognition (CVPR), 2018, pp. 7756-7764.

Singh et al., "An Analysis of Scale Invariance in Object Detection—SNIP", Proceedings of the IEEE Conference on Computer Vision and Pattern Recognition (CVPR), 2018, pp. 3578-3587.

Li et al., "Scale-aware Fast R-CNN for Pedestrian Detection", arXiv, Jun. 25, 2016, pp. 1-10.

Li et al., "Zoom Out-and-in Network with Map Attention Decision for Region Proposal and Object Detection", arXiv, Sep. 13, 2017, pp. 1-12.

Guan et al., "Atrous Faster R-CNN for Small Scale Object Detection", 2nd International Conference on Multimedia and Image Processing (ICMIP), Mar. 17-19, 2017, pp. 16-21.

Li et al., "An Efficient Object Detection Algorithm Based on Compressed Networks", Symmetry, vol. 10, No. 7, 2018, pp. 1-13.

Hara et al., "Attentional Network for Visual Object Detection", arXiv, Feb. 6, 2017, 8 pages.

Yang et al., "Exploit All the Layers: Fast and Accurate CNN Object Detector with Scale Dependent Pooling and Cascaded Rejection Classifiers", IEEE Conference on Computer Vision and Pattern Recognition (CVPR), Jun. 27-30, 2016, 9 pages.

Liu et al., "Recurrent Scale Approximation for Object Detection in CNN", arXiv, Feb. 8, 2018, 9 pages.

International Search Report and Written Opinion received for corresponding Patent Cooperation Treaty Application No. PCT/CN2018/110064, dated Jul. 15, 2019, 10 pages.

Office action received for corresponding Chinese Patent Application No. 201880098586.6, dated Jul. 12, 2023, 5 pages of office action and no page of translation available.

European Communication Pursuant to Article 94(3) EPC for European Application No. 18936855.8 mailed Dec. 8, 2023.

Chinese Ofice Action for Chinese Application No. 201880098586.6 mailed Apr. 18, 2024.

European Office Action for European Patent Application No. 18936855, dated May 28, 2025.

* cited by examiner

METHOD, APPARATUS AND COMPUTER READABLE MEDIA FOR OBJECT DETECTION

RELATED APPLICATION

This application was originally filed as PCT Application No. PCT/CN2018/110064, filed on Oct. 12, 2018 of which is incorporated herein by reference in its entirety.

FIELD

Non-limiting and example embodiments of the present disclosure generally relate to a technical field of signal processing, and specifically to methods, apparatuses and computer program products for detecting objects in an image.

BACKGROUND

This section introduces aspects that may facilitate better understanding of the disclosure. Accordingly, the statements of this section are to be read in this light and are not to be understood as admissions about what is in the prior art or what is not in the prior art.

Object detection is a key task in various applications such as Human-Machine Interaction, Security Surveillance, and Advanced Driver Assistant Systems (ADAS). For example, in a scenario of Autonomous Driving, it is significant for detecting objects precisely, since losses of a life and/or property may be caused if an object is not detected or wrongly detected.

Therefore, improving accuracy of object detection is of great importance.

SUMMARY

Various embodiments of the present disclosure mainly aim at providing methods, apparatuses and computer storage media for object detection.

In a first aspect of the disclosure, there is provided a method of image processing. The method comprises: extracting a generic feature of an image characterizing one or more general properties of the image; identifying one or more regions of interest (ROIs); generating scale information on one or more objects in the image based on the generic feature and one or more candidate scales; generating one or more scale-specific features of the image based on the scale information; and detecting the one or more objects in the image based on the identified one or more ROIs and the one or more scale-specific features.

In some embodiments, extracting the generic feature of the image may comprise: extracting the generic feature via one or more convolutional blocks of a convolutional neural network (CNN). In some embodiments, the one or more convolutional blocks may form a backbone network of the CNN.

In some embodiments, identifying the one or more ROIs may comprises generating one or more region proposals for the one or more object via a region proposal network (RPN), wherein a region proposal indicates a ROI of an object.

In some embodiments, generating the scale information may comprise determining a scale for each of the one or more objects from the one or more candidate scales; and generating the scale information based on the scales determined for the one or more objects. In some further embodiments, generating the scale information based on the scales determined for the one or more objects may comprise: for each candidate scale of the one or more candidate scales, determining a dilation rate associated with the candidate scale for dilation convolution; determining a convolutional kernel based on the determined dilation rate and the scales determined; and generating the scale information associated with the candidate scale by a convolution of the generic feature and the convolutional kernel.

In some embodiments, generating one or more scale-specific features of the image based on the scale information may comprise: for each candidate scale of the one or more candidate scales, generating features associated with the candidate scale by combining scale information associated with the candidate scale with the generic feature or a further feature generated based on the generic feature. In some embodiments, combining scale information associated with the candidate scale with the generic feature or the further feature may comprise: combining the scale information associated with the candidate scale with the generic feature or the further feature based on an element wise multiplication.

In some embodiments, detecting the one or more objects in the image may comprise: determining a scale for each of the identified one or more ROIs based on the one or more candidate scales; extracting scale-specific region features from the one or more scale-specific features based on the determined scale of the ROI; and detecting the one or more objects in the image based on the scale-specific region features. In some embodiments, detecting the one or more objects in the image based on the scale-specific region features may comprise: for each candidate scale of the one or more candidate scales; detecting one or more objects with the candidate scale based on the scale-specific region features; and determining information concerning the detected objects, the information comprising at least one of: a coordinate, a bounding box and a classification.

In some embodiments, the method may further comprise integrating the determined information concerning the detected objects with the one or more candidate scales. In some embodiments, the integrating of the determined information is implemented via non-maximum suppression (NMS).

In some embodiments, the method may further comprise outputting a detection result of the one or more objects.

In a second aspect of the present disclosure, there is provided an apparatus for object detection. The apparatus comprises at least one processor; and at least one memory including computer program codes; the at least one memory and the computer program codes are configured, with the at least one processor, to cause the computing device at least to: extract a generic feature of an image characterizing one or more general properties of the image; identify one or more ROIs; generating scale information on one or more objects in the image based on the generic feature and one or more candidate scales; generating one or more scale-specific features of the image based on the scale information; and detecting the one or more objects in the image based on the identified one or more ROIs and the one or more scale-specific features.

In a third aspect of the present disclosure, there is provided another apparatus for object detection in an image. The apparatus comprises means for extracting a generic feature of an image characterizing one or more general properties of the image; means for identifying one or more ROIs; means for generating scale information on one or more objects in the image based on the generic feature and one or more candidate scales; means for generating one or more scale-specific features of the image based on the scale information; and means for detecting the one or more objects in the image based on the identified one or more ROIs and the one or more scale-specific features. In some embodiments, the means may comprises at least one processor; and at least one memory including computer program code, the at least one memory and computer program code configured to, with the at least one processor, cause the performance of the apparatus.

In a fourth aspect of the disclosure, there is provided a computer program. The computer program comprises instructions which, when executed by an apparatus, causes the apparatus to carry out the method according to the first aspect of the present disclosure.

In a fifth aspect of the disclosure, there is provided a computer readable medium with a computer program stored thereon which, when executed by an apparatus, causes the apparatus to carry out the method of the first aspect of the present disclosure.

In a six aspect of the present disclosure, there is provided a computing device. The computing device comprises the apparatus according to the second or third aspect of the present disclosure.

In a seventh aspect of the disclosure, there is provided a non-transitory computer readable medium comprising program instructions for causing an apparatus to perform a method of the first aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
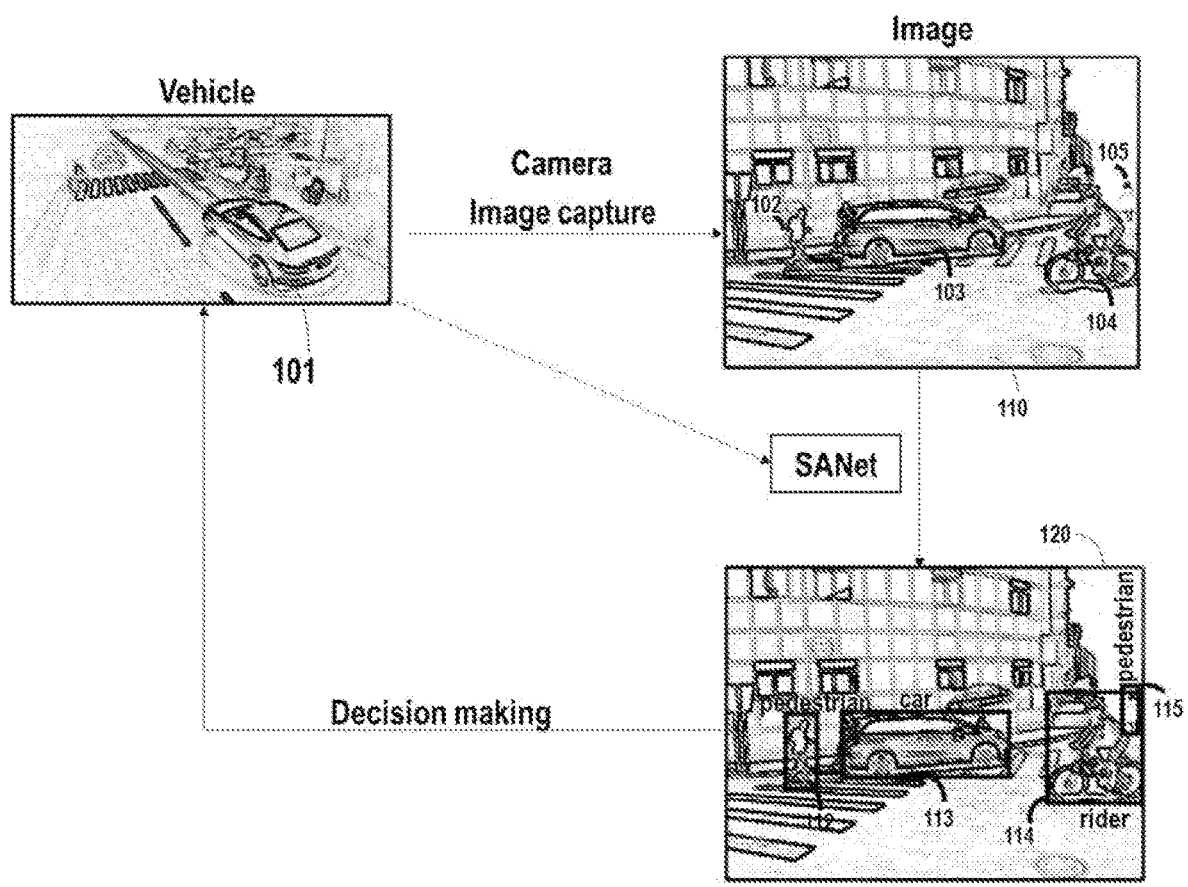
FIG. 1 shows an Autonomous Driving System (ADS) application scenario where embodiments of the present disclosure may be implemented.

Hereinafter, the principle and spirit of the present disclosure will be described with reference to illustrative embodiments. It should be understood that all these example embodiments are given merely for one skilled in the art to better understand and further practice the present disclosure, but not for limiting the scope of the present disclosure. For example, features illustrated or described as part of one embodiment may be used with another embodiment to yield still a further embodiment.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a computing device.

As used herein, the term "computing device" or "apparatus" refers to any device that is capable of computing and data processing. By way of example rather than limitation, a computing device may include, but is not limited to one or more of a video camera, a still camera, a radar, a Light Detection and Ranging (LiDAR) device, a mobile phone, a cellular phone, a smart phone, voice over IP (VoIP) phones, wireless local loop phones, a tablet, a wearable terminal device, a personal digital assistant (PDA), portable computers, desktop computer, a server computer, image capture terminal devices such as digital cameras, gaming terminal devices, a sensor device installed with camera, a vehicle installed with a camera, a drone installed with a camera, and an robot installed with a camera, and the like, or any combination thereof.

As yet another example, in an Internet of Things (IOT) scenario, a computing device or an apparatus may represent a machine or other device that performs monitoring and/or measurements, and transmits the results of such monitoring and/or measurements to another device. The computing device may in this case be a machine-to-machine (M2M) device, which may in a 3GPP context be referred to as a machine-type communication (MTC) device.

A computing device may be utilized in, for example, visual surveillance and/or Autonomous Driving System (ADS), and may have an image processing capability.

Object detection is a key task in image processing in various applications, such as Human-Machine Interaction, Security Surveillance, and Advanced Driver Assistant Systems (ADAS).

In practice, objects in an image may differ in size. For example, road scenes used for the ADS or the ADAS may be complex and include objects with various scales. An object close to a camera may appear large while an object far from the camera may appear small. In addition, a car appears much larger than a pedestrian if they are at similar distances from the camera. The difference in scales of objects causes a problem in object detection, which may be referred to as a scale problem and makes the object detection challenging.

In object detection methods with CNN, features are extracted from an image without taking the scale problem into consideration. As a result, features from large objects dominate the overall detection, while features from small objects are covered when compared with salient features from the large objects. It causes poor detection performance for small objects. However, it is important to detect some small objects like a pedestrian or a small animal precisely in some application scenarios, for example the ADS.

In addition, a scale of an object may vary with its distance from the camera. Therefore, a CNN without distinguishing scales of objects is obviously unreasonable for object detection.

In the present disclosure, new object detection solutions are proposed for solving the scale problem and improving performance of object detection.

FIG. 1 shows an example application scenario to which object detection solutions proposed herein may be applied. In FIG. 1, an apparatus 101 with a camera, for example a car, may support ADS or ADAS, and it captures an image 110 of a road. As shown in FIG. 1, image 110 includes several objects with different sizes, for example a pedestrian 102, a car 103, a rider 104 and another pedestrian 105. Then image 110 may be processed via an object detection solution proposed herein, and the objects in the image 110 may be detected and indicated via bounding boxes 112-115 in image 120.

In some embodiments of the present disclosure, objects in an image (e.g., image 110 in FIG. 1) may be detected via an effective scale attention network (which is referred to as SANet hereafter) proposed herein. The SANet includes a scale attention module (SAM) for extracting scale attention under supervision of a specific scale mask, and a scale detection module (SDM) for scale-aware detection based on the extracted scale attention which represents attention of an object with a given scale. In visual scenes, humans can easily pay attention to and distinguish different objects with different scales. Such a mechanism is called attention. The SAM in the SANet proposed herein is to improve detection performance by imitating the attention mechanism.

In some embodiments, the SANet further includes a region proposal network (RPN) for generating one or more object proposals. An object proposal covers a region of interest (ROI) where an object may appear.

In some embodiments, in the SDM, ROIs extracted by the RPN are approximated/mapped to appropriate scales from a set of one or more predetermined candidate scales. For example, the set of predetermined candidate scales may include three scales, i.e., a small scale, a median scale and a large scale. Correspondingly, the ROIs may be divided into ROIs with small scale, RIOs with median scale, and ROIs with large scale. Then each ROI with a specific scale is pooled on scale-aware features associated with a corresponding scale. In some embodiments, ROIs with different scales may be regressed and classified by separate and respective detection heads to provide detection results for objects with different scales.

In some example embodiments, scale-aware features may be extracted by separating features of objects with different scales. By detecting objects based on specific scale features, the scale problem in object detection can be solved effectively without much time cost.

Figure 2A:
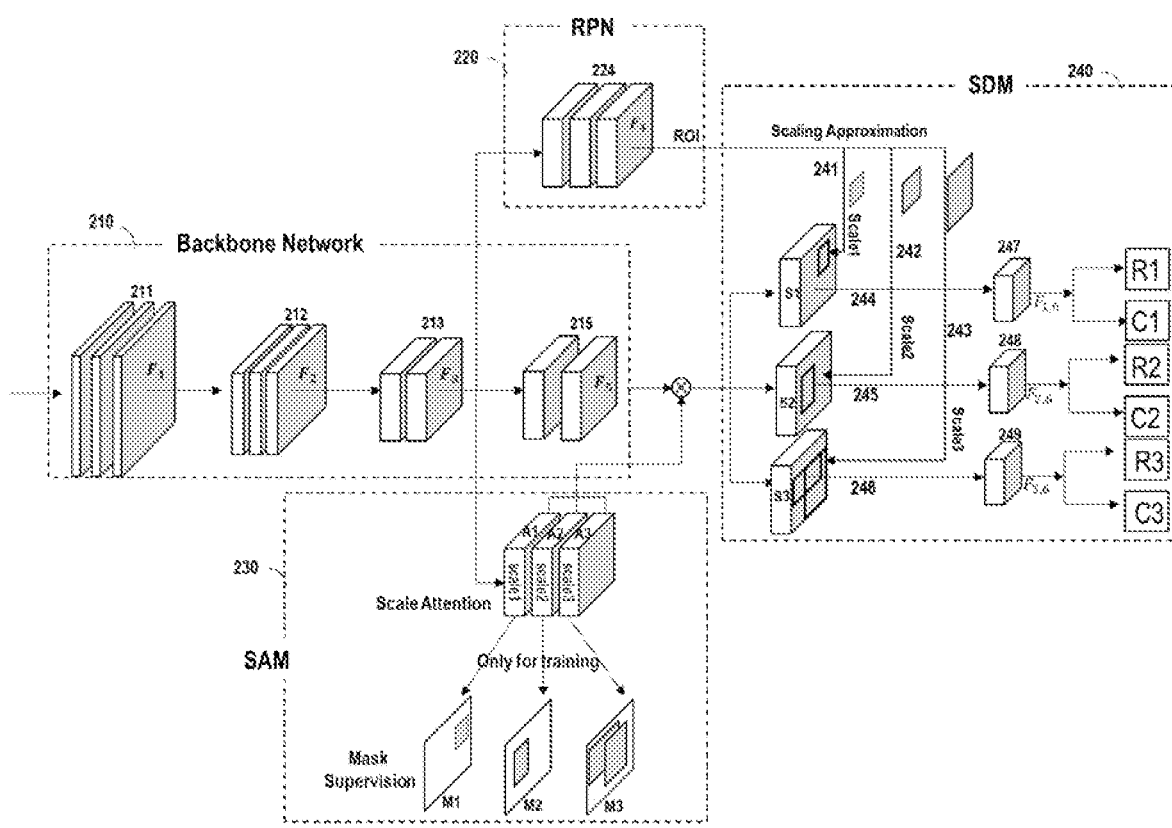
FIG. 2A shows an example architecture of a CNN for object detection according to an example embodiment of the present disclosure.

For illustration without limitation, FIG. 2A shows an example structure 200 of the proposed SANet schematically. In the example, the SANet includes a backbone network 210, a RPN 220, a SAM 230, and a SDM 240.

The backbone network 210 is configured for general feature extraction, and may be implemented as a sub-network in a CNN based object detection method for generic feature extraction. In the example shown in FIG. 2A, the backbone network 210 comprises 4 convolutional blocks 211, 212, 213, and 215, each of which may include a plurality of convolutional layers. Generic features of an input image (e.g., an image 110 in FIG. 1) output from convolutional blocks 211, 212, 213, and 215 of the backbone network 210 are denoted as $F_1$, $F_2$, $F_3$ and $F_5$ hereafter for simplicity. It should be appreciated that embodiments of the present disclosure are not limited to any specific number of the convolutional blocks or convolutional layers to construct a backbone network. In other words, less or more convolutional blocks may be stacked to form the backbone network in other example embodiments.

The RPN 220 is configured for generating object proposals (also referred to as region proposals), and may be implemented in the same way as a RPN module used in a conventional object detection method. For example, the RPN 220 may be same as that used in a faster region-CNN (R-CNN) based method. In the example of FIG. 2A, the RPN 220 comprises a convolutional block 224 which may comprise several convolutional layers for generating ROIs.

The one or more object/region proposals generated by the RPN 220 cover one or more ROI(s) where respective objects may appear.

The SAM 230 is configured for generating scale attention. In order to generate the scale attention, scale mask supervision may be adopted in a training phase of the SANet. For instance, a set of candidate scales, such as small scale, median scale and large scale, or any number of scales, may be predetermined or predefined, and correspondingly objects in the input image may be grouped into small objects, middle objects, and large objects, or any other group of objects. On this basis, scale masks $M_i$ may be generated by:

$$M_i = \begin{cases} 1, \text{ where objects with the } ith \text{ Scale appear} \\ 0, \text{ others} \end{cases} \quad (1)$$

$$i = 1, 2, 3.$$

Thus, $M_1$ is generated by labeling a value of "1" for positions where small objects appear and a value of "0" for other positions. $M_2$ is generated by labeling a value of "1" for positions where median objects appear and a value of "0" at other positions. Likewise, $M_3$ is generated by labeling a value of "1" for positions where large objects appear and a value of "0" at other positions. Alternatively, i=n, wherein n is any real number. As an example, for image 110 in FIG. 1, values for $M_3$ are set to "1" for positions where the car 103 and the rider 104 appear, and set to zero for other positions. By using this scale mask, scale information, which may be referred to as supervision $A_1$, $A_2$ and $A_3$, or $A_n$ represent the attention of small scale objects, middle scale objects, and large scale objects, or any scale of objects respectively, may be generated from generic features (e.g., features $F_3$ from convolutional block 213 of the backbone network 210) as follows:

$$A_i = F_3 \otimes W_{ri}, i = 1, 2, 3. \quad (2)$$

where '⊗' represents a dilation convolution operation, and $W_{ri}$ represents the convolutional kernel for generating attention of scale i with a dilation rate ri. Alternatively, i=n, and n is any real number. $W_{ri}$ may be obtained based on the scale masks $M_i$ shown in in equation (1) during the training phase. Since objects with different scales cover regions with different sizes in an image, dilation convolutions with different dilation rates may be used for generating $A_1$, $A_2$, and $A_3$ to meet the scale demands. That is, the dilation rate ri associated with each $W_{ri}$ may be different. In particular, the dilation rates ri for different scales should satisfy a condition of $r_1 < r_2 < r_3$, to generate different receptive fields for different scale attentions $A_1$, $A_2$ and $A_3$ associated with small scale objects, middle scale objects, and large scale objects respectively. Alternatively in (2), feature $F_3$ may be replaced with any $F_i$ output from any convolutional block.

The operation of generating attention $A_i$ based on $W_{ri}$ which is generated based on the mask $M_i$ is referred to as mask supervision which is a kind of weak supervision. During generating $W_{ri}$ in the training phase, a SoftmaxLoss function may be used as a cost function. Thus, $A_1$ resulting from equation (2) only pays attention to the small objects, while $A_2$ only pays attention to middle objects, and $A_3$ only pays attention to large objects.

The proposed SDM 240 in the example of FIG. 2A is designed for detecting objects with different scales, respectively. In some embodiments, by combining features (for example $F_5$ output from 215 of backbone network 210 in FIG. 2A, which is obtained based on generic features $F_3$) with the scale attentions $A_1$, $A_2$, and $A_3$ from SAM 230, multi-scale features may be generated by:

$$S_1 = A_1 e F_5, \quad S_2 = A_2 e F_5, \quad S_3 = A_3 e F_5. \quad (3)$$

where 'e' represents elements multiply, and $S_1$, $S_2$ and $S_3$ represent small scale features, middle scale features, and large scale features, respectively. That is, in the proposed solutions, features associated with different scales are separated for further processing.

It should be appreciated that though in this example, the multi-scale features (i.e., features associated with different scales) are obtained based on features $F_5$, embodiments are not limited to such a specific implementation. Instead, the multi-scale features may be obtained based on generic features F (e.g., $F_3$ in FIG. 2A) in some embodiments. In general, Si, Ai and Fi may be used in equation (3) wherein i=n, and n is any real number.

In some embodiments, detection performance may be further improved by aggregating a feature pyramid to make predictions on different stages (e.g., convolutional blocks 211, 212, 213 and 215 in FIG. 2A) of the CNN.

Now still refer to FIG. 2A. In some embodiments, ROIs extracted by RPN 220 are approximated (241, 242, and 243) to different scales according to the same scale partition as that in SAM 230. Then ROI pooling (244, 245 and 246) is conducted separately for objects with different scales on the multi-scale features $S_i$. Pooling may be considered as an operation like sampling which extracts features of corresponding positions.

In some embodiments, a further convolutional block composed of several convolutional layers may be used to extract features after each RIO Pooling. For example, in FIG. 2A, small ROIs are extracted based on $S_1$ via ROI polling to obtain region features (which may have a fixed size (e.g., 7×7)), and then the region features are further extracted to obtain features $F_{1.6}$ by using a convolutional block 247. Likewise, middle ROIs are extracted based on $S_2$ via ROI polling to obtain region features which are further extracted to obtain features $F_{2.6}$ by using a convolutional block 248, and large ROIs are extracted based on $S_3$ via ROI polling to obtain region features which are further extracted to obtain features $F_{3.6}$ by using a convolutional block 249.

The features $F_{1.6}$, $F_{2.6}$ and $F_{3.6}$ associated with different scales are used for detection of objects in the input image (e.g., image 110 in FIG. 1). In some embodiments, one or more different detection heads (Ri, Ci, i=1, 2, 3, . . . )) may be used for regression R and classification C of bounding boxes of objects with different scales. For illustration purpose only, three detection heads denoted as ((R1,C1), (R2, C2), (R3,C3)) respectively, are shown in FIG. 2A.

Figure 2B:
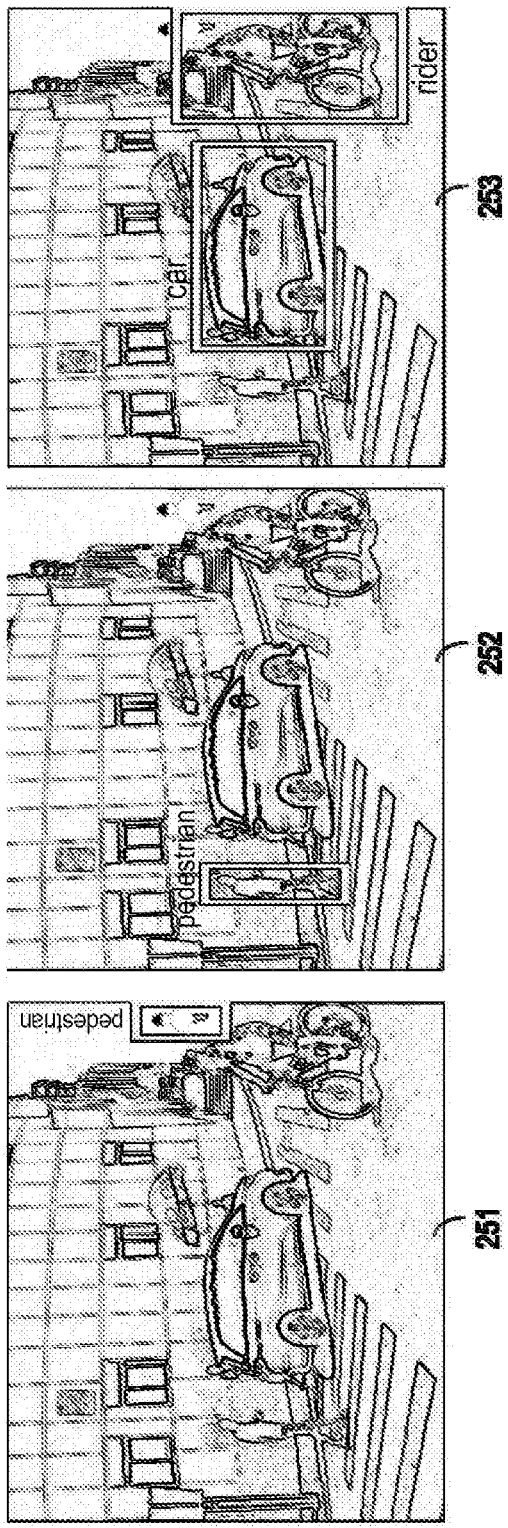
FIG. 2B shows an example of detection results for objects with different scales according to an example embodiment of the present disclosure

Taking input image 110 in FIG. 1 as an example, there are at least four objects, from the near to the distant, a rider 104, a pedestrian (person) 102, a car 103, and a pedestrian 105 for detection. The pedestrian 105 which has the smallest scale is detected by the detection head (R1,C1) dedicated for small objects to obtain a detection result 251 shown in FIG. 2B, the pedestrian 102 is detected by the detection head (R2, C2) dedicated for middle objects to obtain a detection result 252 in FIG. 2B, and other objects are detected by the detection head (R3,C3) dedicated for large objects to obtain a detection result 253 in FIG. 2B.

Optionally, in some embodiments, the detection results 251-253 may be fused/integrated into a single image (e.g., image 120 in FIG. 1), for example by using Non Maximum Suppression (NMS) to provide a final output.

The SANet proposed here may be implemented as a deep CNN. Before being used for object detection in practice, the SANet may be trained using a large number of image samples. Embodiments are not limited to any specific training mechanism, instead, any proper training solutions existing or to be developed in the future may be adopted. As an example rather than limitation, the training stage of SANet may include some or all of the following operations.

An example of the SANet to be trained may be similar to that shown in FIG. 2A, that is, the SANet may include a backbone network, a RPN, a SAM, and a SDM. The backbone network and the RPN may be similar to those used in a conventional CNN (e.g., a Faster R-CNN or a Region-based Fully Convolutional Networks (R-FCN)) or other existing famous detection network. A set of candidate scales for objects may be predetermined or predefined. That is, objects may be grouped into several (e.g., 3 or more) scales. Both the SAM and the SDM support same number (e.g., 3, or more) of scales as that in the defined set. For instance, the SAM and SDM may be designed in a same way as that described with reference to FIG. 2A.

During the training stage, supervisions, including mask supervision in SAM and regression supervision and a classification supervision for each scale in SDM, may be performed to guarantee accurate detection.

A set of training images and their ground truth may be provided for supervised training of the SANet. For supervision of scale attentions (e.g., $A_i$ in SAM), masks $M_i$ may act as the ground truth. For supervision of the regression and classification (e.g., (R1,C1) in FIG. 2A) in SDM, the ground truth may be objects labels (e.g., position and/or classification of the objects) in each scale.

Parameters initialization may be performed during the training stage. The parameters to be initialized may include learnable convolutional filters and other parameters in the SANet. For example, parameters related to the backbone network and the RPN may be initialized by pre-trained parameters from ImageNet or detection datasets. Other learnable parameters may be randomly initialized, for example, by using Gaussian, Xavier or other methods used in the deep CNN.

In some embodiments, the SANet may be trained iteratively. For instance, the SANet may be trained by forward propagation and backward propagation. Alternatively or in addition, parameters may be optimized by performing the stochastic gradient decent (SGD) algorithm iteratively until convergence.

After training, the SANet may be used for detecting objects in images (including videos) to determine precise object localization (e.g., a bounding box) and object recognition (e.g., classification). As an example, a detection result of an input image may be produced by performing the following operations: extracting generic features by a backbone network; generating region proposals by a RPN; generating scale attention by a SAM; generating scale attention features; detecting objects on corresponding scales based on the scale attention features; and fusing/integrating detection results for each scale (e.g., by using NMS) to generate a final result.

The proposed SANet can effectively solve the detection problems caused by different scales of objects, and improve detection performance in various applications, including but not limited to the ADAS and the ADS.

Figure 3:
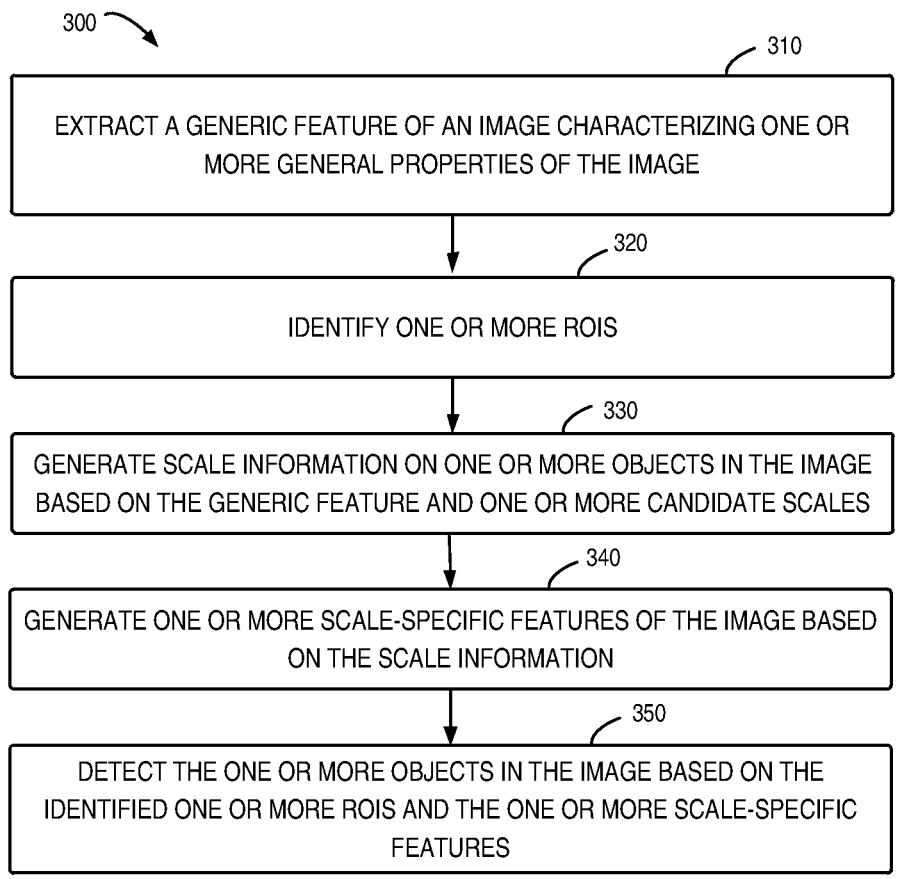
FIG. 3 shows a flow chart of a method of object detection according to an example embodiment of the present disclosure.

In another aspect of the present disclosure, methods for object detection are proposed. FIG. 3 shows operations of a method 300 for object detection according to an embodiment of the present disclosure. The method 300 may be implemented by a computing device or an apparatus, for example, the vehicle 101 shown in FIG. 1 or an apparatus installed in the vehicle 101. However, it should be appreciated that the method 300 may also be implemented in any computing device or apparatus. Furthermore, in some embodiments, some or all operations of the method 300 may be implemented in a cloud. Just for illustration purpose, and without limitation, the method 300 will be described below with reference to a computing device.

As shown in FIG. 3, at block 310, the computing device extracts a generic feature of an image. The Extracted feature characterizes one or more general properties of the image. For illustration rather than limitation, the operation of block 310 may be implemented via one or more convolutional blocks of a CNN (for example, convolutional blocks 211, 212, 213 and 215 in FIG. 2A). The one or more convolutional blocks may form a backbone network of the CNN (e.g., the backbone 210 in FIG. 2A).

At block 320, the computing device identifies one or more ROIs. For example, the computing device may generate one or more region proposals for one or more objects in the image via a RPN (e.g., the RPN 220 in FIG. 2A). A region proposal indicates a ROI of an object. In some embodiments, operations of block RPN may be performed in the same way as that in a conventional detection network, e.g., R-CNN.

At block 330, the computing device generates scale information on the one or more objects in the image based on the extracted generic feature and one or more candidate scales (e.g., 3 predetermined scales, i.e., small scale, median scale and large scale, or more candidate scales). The scale information may include, but is not limited to, scale attention. In some embodiments, at block 330, the computing device may determine a scale for each of the one or more objects from the one or more candidate scales. In other words, the one or more objects may be grouped into different scales. Then based on the scales determined for the one or more objects, the computing device may generate the scale information, e.g., the scale attention.

Figure 4:
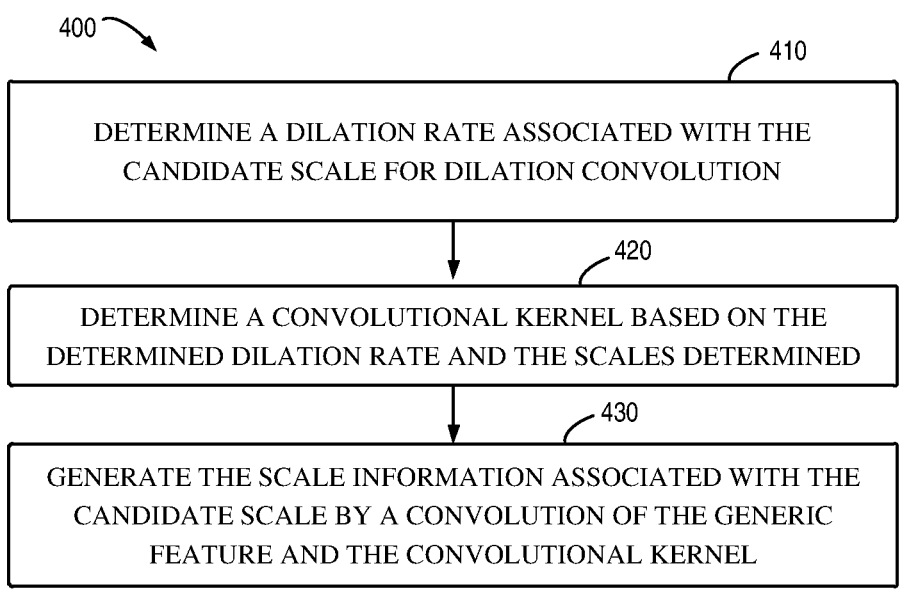
FIG. 4 shows example operations for generating scale information according to an example embodiment of the present disclosure.

In some embodiments, the computing device may generate the scale information by performing operations 400 shown in FIG. 4 for each candidate scale of the one or more candidate scales. As shown in FIG. 4, at block 410, the computing device may determine a dilation rate $r_i$ associated with a candidate scale i for dilation convolution. At block 420, a convolutional kernel $W_{ri}$ is determined based on the determined dilation rate $r_i$ and the scales determined, and at block 430, the computing device generates the scale information $A_i$ associated with the candidate scale i by a convolution of the generic feature and the convolutional kernel $W_{ri}$. For instance, the scale information may be obtained based on equation (2)

Now refer back to FIG. 3. Based on the scale information generated at block 330, at block 340, the computing device generates one or more scale-specific features of the image. As an example rather than limitation, the computing device may generate the one or more scale-specific features by generating one or more features associated with each candidate scale of the one or more candidate scales separately. In some embodiments, for each candidate scale i of the one or more candidate scales, the computing device may generate features $S_i$ associated with the candidate scale i by combining scale information (e.g., $A_i$) associated with the candidate scale i with the generic feature (e.g., $F_3$ in FIG. 2A) or a further feature (e.g., $F_5$ in FIG. 2A) generated based on the generic feature. For illustration without limitation, the scale-specific features, or in other words features associated with each scale, may be generated by combining the scale information (e.g., $A_i$) associated with the candidate scale i with the generic feature (e.g., $F_3$ in FIG. 2A) or the further feature (e.g., $F_5$ in FIG. 2A) based on an element wise multiplication, e.g., based on equation (3). In this way, features associates with different scales are separated for further processing. This operation differs from existing detection mechanisms and results in improved detection performance.

At block 350, the computing device detects the one or more objects in the image based on the identified one or more ROIs and the generated one or more scale-specific features. In some embodiments, objects with different scales are detected separately via corresponding detection heads.

Figure 5:
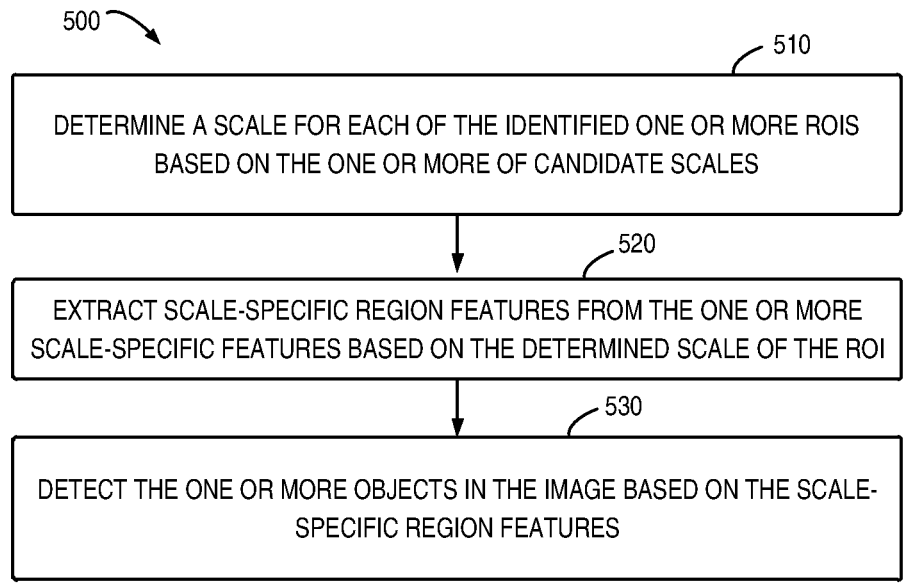
FIG. 5 shows example operations for object detection according to an example embodiment of the present disclosure.

Alternatively or in addition, in some embodiments, the detection performed at block 350 may include operations 500 shown in FIG. 5. In the example shown in FIG. 5, the computing device determines a scale for each of the identified one or more ROIs based on the one or more candidate scales at block 510. The determined scale of the ROI is used for extracting scale-specific region features from the one or more scale-specific features at block 520. As an example rather than limitation, the computing device may extracting scale-specific region features (e.g., $F_{1.6}$, $F_{2.6}$ and $F_{3.6}$) from the one or more scale-specific features (e.g., $S_1$, $S_2$ and $S_3$) via ROI pooling and optionally a further convolution operation following the ROI pooling, as shown in FIG. 2A in SDM 240. At block 530, the computing device detects the one or more objects in the image based on the scale-specific region features.

In some embodiments, the detection may include regression R and classification C, as shown in the example of FIG. 2A. As an example without limitation, at block 530, for each candidate scale i of the one or more candidate scales, the computing device may detect (e.g., via a dedicated detection head for this scale i) one or more objects with the candidate scale i based on the scale-specific region features, and determine information concerning the detected objects. The determined information may include, for example but not limited to, one or more of: a coordinate, a bounding box and a classification, or any combination thereof.

In the embodiments where the information for objects with different scales are determined separately, the computing device may further integrate the determined information concerning the detected objects with the one or more candidate scales, e.g., into a single image 120 shown in FIG. 1. The integration may be implemented, for example, by fusing via non-maximum suppression (NMS).

In some embodiments, the computing device may output detection results of the one or more objects, for example at block 360, as shown in FIG. 3. For instance, the image 120 shown in in FIG. 1 with bounding boxes for objects may be output.

Table 1 below shows comparisons of detection performance between a proposed detection mechanism based on the SANet in FIG. 2A and a baseline detection method known as Faster R-CNN plus a feature pyramid network (FPN).

TABLE 1

Detection performance of SANet and a baseline method

| Method | AP-mean | AP-small | AP-median | AP-large |
|---|---|---|---|---|
| Baseline | 33.9 | 17.8 | 37.7 | 45.8 |
| SANet(ours) | 37.8 | 23.4 | 41.1 | 49.3 |

In the comparison, COCO detection dataset is used for evaluating the performance of the proposed SANet. There are 80 category objects in COCO dataset. A union of 80k train images is utilized for training the SANet, and 5k images are utilized to test the performance as that in FPN. Three candidate scales are predefined in the SANet to be tested. Results of the testing show that Faster R-CNN+FPN can achieve a mean accuracy precision (AP) of 33.9%, and the proposed SANet solution achieves a mean AP of 37.8%, which means that the proposed solution outperforms the baseline method by 3.9%. In addition, as shown in the Table 1, SANet improves the detection performance for each scale by a large margin, especially for detecting small objects (23.4 vs 17.8).

Through description of some example embodiments, those skilled in the art can appreciate that by using scale attention, the proposed object detection solution in some embodiments may group objects into several scales and detect objects with each scale based on corresponding scale features. Scales of objects may be variable in complex practical scenes, and directly detecting objects without distinguishing the scales makes the detection performance poor. However, by using the proposed 'divide and rule' mechanism, the scale problem which lies in the heart of object detection can be solved effectively.

Different from image pyramid methods and feature pyramid methods, the methods proposed herein won't bring much time cost and can tackle the root of scale problems. In addition, the proposed scale attention module and scale detection module may be combined with other superior detection networks to further improve the detection performance.

Figure 6:
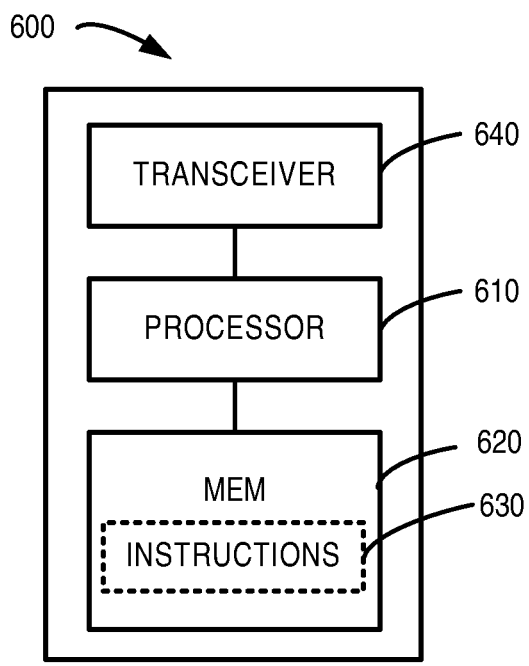
FIG. 6 illustrates a simplified block diagram of an apparatus that may be embodied as/in a computing device according to an example embodiment of the present disclosure.

FIG. 6 illustrates a simplified block diagram of an apparatus 600 that may be embodied in/as a computing device or an apparatus which may include, but is not limited to, a camera device, a vehicle installed with the camera device, a drone installed with the camera device, an industrial robot with the camera device, etc.

As shown by the example of FIG. 6, apparatus 600 comprises a processor 610 which controls operations and functions of apparatus 600. For example, in some embodiments, the processor 610 may implement various operations by means of instructions 630 stored in a memory 620 coupled thereto. The memory 620 may be any suitable type adapted to local technical environment and may be implemented using any suitable data storage technology, such as semiconductor based memory devices, magnetic memory devices and systems, optical memory devices and systems, fixed memory and removable memory, as non-limiting examples. In some example embodiments the memory 620 can be a non-transitory computer readable medium. Though only one memory unit is shown in FIG. 6, a plurality of physically different memory units may exist in apparatus 600.

The processor 610 may be any proper type adapted to local technical environment, and may include one or more of general purpose computers, special purpose computers, microprocessors, digital signal processors (DSPs), central processing units (CPUs), field-programmable gate arrays (FPGA), application specific circuits (ASIC), GPUs (Graphics Processing Unit), NPUs (Neural Network Processing Unit), AI (Artificial Intelligence) accelerators and processors based on multicore processor architecture, as non-limiting examples. The apparatus 600 may also comprise a plurality of processors 610 in any combination thereof.

The processors 610 may also be coupled with one or more radio transceiver 640 which enables reception and transmission of information over wireless communication means. In some embodiments, the radio transceiver(s) 640 may comprise wireless communication means (e.g. wireless networking means, wireless telecommunication means, means for communicating according to Long Term Evolution (LTE), the fifth generation (5G) communication, Narrow Band Internet of Things (NB-IoT), Long Range Wide Areas Network (LoRaWAN), Dedicated short-range communications (DSRC), and/or Wireless Local Area Network (WLAN), communication standards, etc.) which allows the apparatus 600 to communicate with other devices/apparatuses, for example, in vehicle-to-vehicle (V2V), vehicle-to-anything (V2X), peer-to-peer (P2P), etc. manners, and send and receive image detection related information. Additionally, the processors 610 may also be coupled to one or more wireline communication means, which enables reception and sending of information over wireline communication networks, such as local area network (LAN), Ethernet, wide area network, or any combination thereof.

In some embodiments, the processor 610 and the memory 620 may operate in cooperation to implement any method described with reference to FIGS. 2-5. It shall be appreciated that all features described above with reference to FIGS. 2-5 also apply to apparatus 600, and therefore will not be detailed here.

Various embodiments of the present disclosure may be implemented by a computer program or a computer program product executable by one or more of the processors (for example processor 610 in FIG. 6), software, firmware, hardware or in a combination thereof.

Although some embodiments are described in the context of object detection, it should not be construed as limiting the spirit and scope of the present disclosure. The principle and concept of the present disclosure may be more generally applicable to semantic segmentation, and other position sensitive application scenarios.

In addition, the present disclosure also provides a carrier containing the computer program as mentioned above (e.g., computer instructions/grogram 630 in FIG. 6). The carrier includes a computer readable storage medium. The computer readable storage medium may include, for example, an optical compact disk or an electronic memory device like a RAM (random access memory), a ROM (read only memory), Flash memory, magnetic tape, CD-ROM, DVD, Blue-ray disc and the like.

Figure 7:
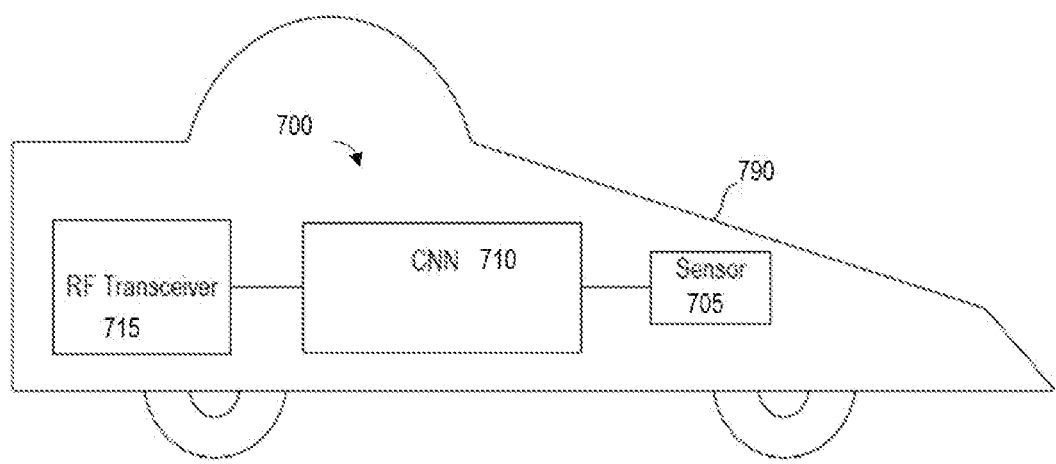
FIG. 7 shows an example system which may be utilized for image detection according to an example embodiment of the present disclosure.

FIG. 7 depicts an example of a system or apparatus 700 including a machine learning model according to an embodiment of the present disclosure. The system or apparatus 700 may be mounted in a vehicle 790, such as a car or truck, although the system or apparatus 700 may be used without the vehicles 790 as well. The vehicle 790 may be considered as an example of an apparatus according to an embodiment of the present disclosure, and may be used, for example, in an ADS application illustrated in FIG. 1.

As shown in FIG. 7, the example system or apparatus 700 includes one or more sensors 705 (e.g., a camera) and a CNN 710 or any other machine learning algorithm or any combination thereof, in accordance with some example embodiments. In some embodiments, the CNN 710 may include one or more convolutional blocks which may form a backbone network, and one or more of a RPN, a SAM, and a SDM, as shown in FIG. 2A.

The system or apparatus 700 may also include one or more radio frequency transceivers 715. In some embodiments, the radio frequency transceiver 715 may include wireless communication means (e.g. wireless networking means, wireless telecommunication means, means for communicating according to LTE, 5G, NB-IoT, LoRaWAN, DSRC, and/or WLAN standards, etc.) which allows the system or apparatus 700 or the vehicle 790 to communicate with other one or more devices, apparatus or vehicles or any combination thereof for example in vehicle to vehicle (V2V), vehicle to network, vehicle to everything (V2X), peer to peer (P2P), etc. manners, and send and receive image detection related information. Further, the system or apparatus 700 or the vehicle 790 may perform image recognition and/or detection of objects in one or more images according to one or more example embodiments of the invention, and provide or send or transmit related one or more instructions or messages to the system or apparatus 700 or the vehicle 790 itself, for example braking, steering, accelerating, cancellation of action, location, image recognition, object classification and/or regression information, or alarm, or any combination thereof. Additionally, the system or apparatus 700 or the vehicle 790 may send message and/or instruction, such as braking, steering, accelerating, cancellation of action, location, image recognition, object classification and/or regression information, alarm, or any combination thereof, to one or more other systems or apparatuses similar to the system or apparatus 700, the vehicle 790, or the apparatus 600, or any combination thereof.

The sensor 705 may comprise at least one image sensor configured to provide image data, such as image frames, video, pictures, and/or the like. In the case of advanced driver assistance systems and/or autonomous vehicles for example, the sensor 705 may comprise a camera, a LiDAR sensor, a millimeter wave radar, an infrared camera, and/or other types of sensors.

In some example embodiments, the system or apparatus 700 may include (but is not limited to) a location detection and determination system, such as a Global Navigation Satellite (GNSS) System with its subsystems, for example, Global Position System (GPS), GLONASS, BeiDou Navigation Satellite System (BDS) and Galileo Navigation Satellite System etc.

Alternatively or in addition, in some example embodiments, the system or apparatus 700 may be trained to detect objects, such as people, animals, other vehicles, traffic signs, road hazards, and/or the like according to, for example, method 300. For instance, with the system or apparatus 700, the vehicle 790 may detect objects 102-105 in FIG. 1 and their relative and/or absolute locations (e.g., longitude, latitude, and altitude/elevation, and/or coordinate).

In the advanced driver assistance system (ADAS), when an object is detected, such as a vehicle/person, an output such as a warning sound, haptic feedback, indication of recognized object, or other indication may be generated for example to warn or notify a driver, for example on a display in the system or apparatus 700, the vehicle 790, or the apparatus 600. In the case of an autonomous vehicle including system or apparatus 700, such as an Autonomous Driving System (ADS) or ADAS, the detected objects may signal control circuitry to take additional action in the vehicle (e.g., initiate breaking, acceleration/deceleration, steering and/or some other action). Moreover, the indication may be transmitted to other vehicles, IoT devices or cloud, mobile edge computing (MEC) platform and/or the like via radio transceiver 715.

For illustration rather than limitation, the CNN 710 may be implemented in at least one CNN circuitry, in accordance with some example embodiments. The CNN circuitry may represent dedicated CNN circuitry configured with a neighbor-based activation function, g, taking into account neighbors. The dedicated CNN circuitry may provide a deep CNN. Alternatively or additionally, the CNN 710 or the CNN circuitry may be implemented in other ways such as, using at least one memory including program code which when executed by at least one processor provides the CNN 710. In some embodiments, the CNN circuitry may implement one or more embodiments for object detection described with reference to FIGS. 2-5.

In some example embodiments, the system or apparatus 700 may have a training phase within the system or apparatus 700. The training phase may configure the CNN 710 to learn to detect and/or classify one or more objects of interest. Referring to the previous example, the CNN circuitry may be trained with images including objects such as people, other vehicles, road hazards, and/or the like. Once trained, when an image includes the object(s), the trained CNN 710 may detect the object(s) and provide an indication of the detection/classification of the object(s). In the training phase, the CNN 710 may learn its configuration (e.g., parameters, weights, and/or the like). Once trained, the configured CNN can be used in a test or operational phase to detect and/or classify patches or portions of an unknown, input image and thus determine whether that input image includes an object of interest or just background (i.e., not having an object of interest). In some other example embodiments, the training phase can be executed out of the system or apparatus 700, for example in a cloud system, wherein the system and the cloud are connected over wired and/or wireless network communication means. In some other alternative embodiments, the training phase can be divided between the system or apparatus 700 and the cloud system.

The techniques described herein may be implemented by various means so that an apparatus implementing one or more functions of a corresponding apparatus described with an embodiment comprises not only prior art means, but also means for implementing the one or more functions of the corresponding apparatus and it may comprise separate means for each separate function, or means that may be configured to perform two or more functions. For example, these techniques may be implemented in hardware (e.g., circuit or a processor), firmware, software, or combinations thereof. For a firmware or software, implementation may be made through modules (e.g., procedures, functions, and so on) that perform the functions described herein.

Some example embodiments herein have been described above with reference to block diagrams and flowchart illustrations of methods and apparatuses. It will be appreciated that each block of the block diagrams and flowchart illustrations, and combinations of blocks in the block diagrams and flowchart illustrations, respectively, may be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept may be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. An apparatus for object detection, comprising:
   at least one processor; and
   at least one memory including computer program code;
   the at least one memory and the computer program code are configured, with the at least one processor, to cause the apparatus at least to:
   extract a generic feature of an image characterizing one or more general properties of the image;
   identify one or more regions of interests (ROIs);
   determine a scale for one or more objects in the image from one or more candidate scales, the one or more candidate scales defined separate from the image, the scale representing a grouping of the one or more objects in the image, and the scale being one of the one or more candidate scales;
   generate scale information on the one or more objects in the image based on the generic feature and the scales determined for the one or more objects;
   generate one or more scale-specific features of the image based on the scale information; and
   detect the one or more objects in the image based on the identified one or more ROIs and the one or more scale-specific features,
   wherein, for a candidate scale of the one or more candidate scales, the generating the scale information based on the scales determined for the one or more objects includes,
   determining a dilation rate associated with the candidate scale for dilation convolution,
   determining a convolutional kernel based on the dilation rate and the scales, and
   generating the scale information associated with the candidate scale by a convolution of the generic feature and the convolutional kernel.

2. The apparatus of claim 1, wherein the at least one memory and the computer program code are further configured, with the at least one processor, to cause the apparatus to extract the generic feature of the image via one or more convolutional blocks of a convolutional neural network (CNN).

3. The apparatus of claim 2, wherein the one or more convolutional blocks form a backbone network of the CNN.

4. The apparatus of claim 1, wherein the identification of the one or more ROIs, further comprises:
   generate one or more region proposals for the one or more objects via a region proposal network (RPN) wherein a region proposal indicates a ROI of an object.

5. The apparatus of claim 1, wherein the generation of the one or more scale-specific features of the image based on the scale information, further comprises:

for the candidate scale of the one or more candidate scales,
generate features associated with the candidate scale by combining the scale information associated with the candidate scale with the generic feature or a further feature generated based on the generic feature.

6. The apparatus of claim 5, wherein the at least one memory and the computer program code are further configured, with the at least one processor, to further cause the apparatus to:
combine the scale information associated with the candidate scale with the generic feature or the further feature based on an element wise multiplication.

7. The apparatus of claim 1, wherein the detection of the one or more objects in the image, further comprises:
determine a scale for the identified one or more ROIs based on the one or more candidate scales;
extract scale-specific region features from the one or more scale-specific features based on the determined scale for the identified one or more ROIs; and
detect the one or more objects in the image based on the scale-specific region features.

8. The apparatus of claim 7, wherein the detection of the one or more objects in the image based on the scale-specific region features, further comprises:
for a candidate scale of the one or more candidate scales,
detect the one or more objects with the candidate scale based on the scale-specific region features; and
determine information concerning the detected one or more objects, the information comprising at least one of: a coordinate, a bounding box or a classification.

9. The apparatus of claim 8, wherein the at least one memory and the computer program code are further configured, with the at least one processor, to cause the apparatus to:
integrate the determined information concerning the detected one or more objects with the one or more candidate scales.

10. The apparatus of claim 9, wherein the at least one memory and the computer program code are further configured, with the at least one processor, to cause the apparatus to integrate the determined information concerning the detected one or more objects via non-maximum suppression (NMS).

11. The apparatus of claim 1, wherein the at least one memory and the computer program code are further configured, with the at least one processor, to cause the apparatus to:
output a detection result of the one or more objects.

12. A method of image processing, comprising:
extracting a generic feature of an image characterizing one or more general properties of the image;
identifying one or more regions of interest (ROIs);
determining a scale for one or more objects in the image from one or more candidate scales, the one or more candidate scales defined separate from the image, the scale representing a grouping of the one or more objects in the image, and the scale being one of the one or more candidate scales;
generating scale information on the one or more objects in the image based on the generic feature and the scales determined for the one or more objects;
generating one or more scale-specific features of the image based on the scale information; and
detecting the one or more objects in the image based on the identified one or more ROIs and the one or more scale-specific features,
wherein, for a candidate scale of the one or more candidate scales, the generating the scale information based on the scales determined for the one or more objects includes,
determining a dilation rate associated with the candidate scale for dilation convolution,
determining a convolutional kernel based on the dilation rate and the scales, and
generating the scale information associated with the candidate scale by a convolution of the generic feature and the convolutional kernel.

13. The method of claim 12, wherein the extracting of the generic feature of the image further comprises:
extracting the generic feature via one or more convolutional blocks of a convolutional neural network (CNN).

14. The method of claim 13, wherein the one or more convolutional blocks forms a backbone network of the CNN.

15. The method of claim 12, wherein the identifying of the one or more ROIs further comprises: generating one or more region proposals for the one or more objects via a region proposal network (RPN), wherein a region proposal indicates a ROI of an object.

16. A non-transitory computer readable medium comprising program instructions that, when executed by at least one processor at an apparatus, cause the apparatus to perform a method comprising:
extracting a generic feature of an image characterizing one or more general properties of the image;
identifying one or more regions of interest (ROIs);
determining a scale for one or more objects in the image from one or more candidate scales, the one or more candidate scales defined separate from the image, the scale representing a grouping of the one or more objects in the image, and the scale being one of the one or more candidate scales;
generating scale information on the one or more objects in the image based on the generic feature and the scales determined for the one or more objects;
generating one or more scale-specific features of the image based on the scale information; and
detecting the one or more objects in the image based on the identified one or more ROIs and the one or more scale-specific features,
wherein, for a candidate scale of the one or more candidate scales, the generating the scale information based on the scales determined for the one or more objects includes,
determining a dilation rate associated with the candidate scale for dilation convolution,
determining a convolutional kernel based on the dilation rate and the scales, and
generating the scale information associated with the candidate scale by a convolution of the generic feature and the convolutional kernel.

* * * * *